H. S. PIERCE.
EQUALIZING GEAR.
APPLICATION FILED JULY 8, 1915.
1,248,396.
Patented Nov. 27, 1917.
3 SHEETS—SHEET 1.
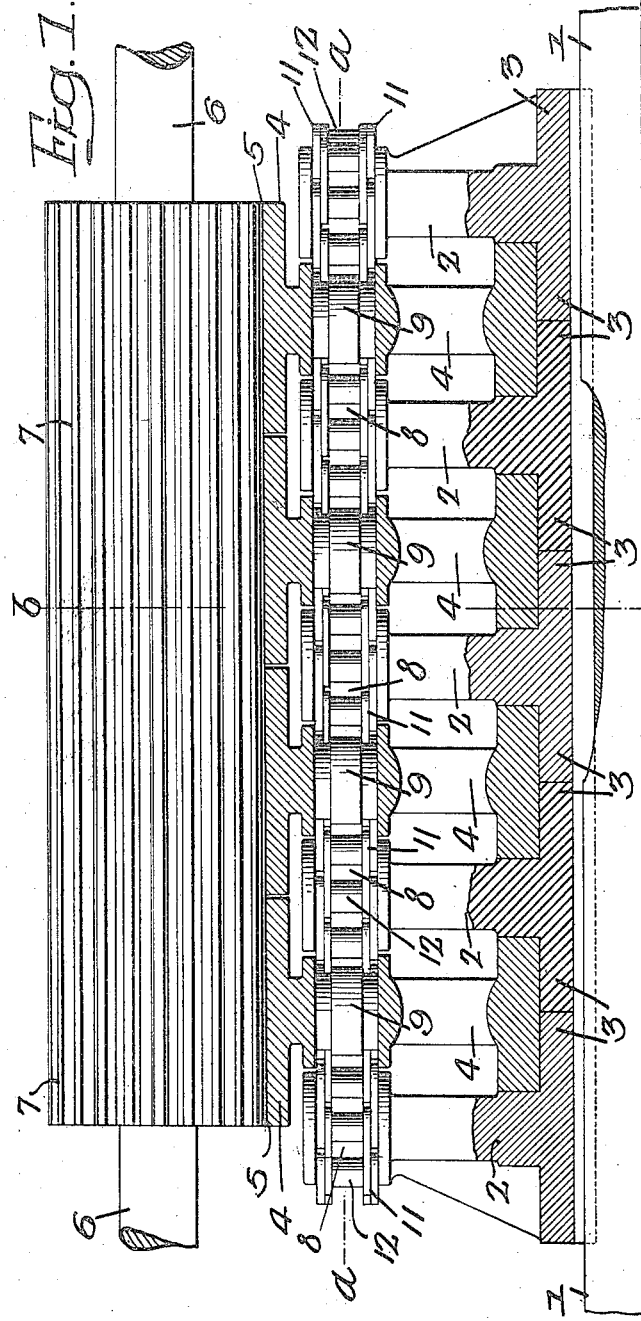
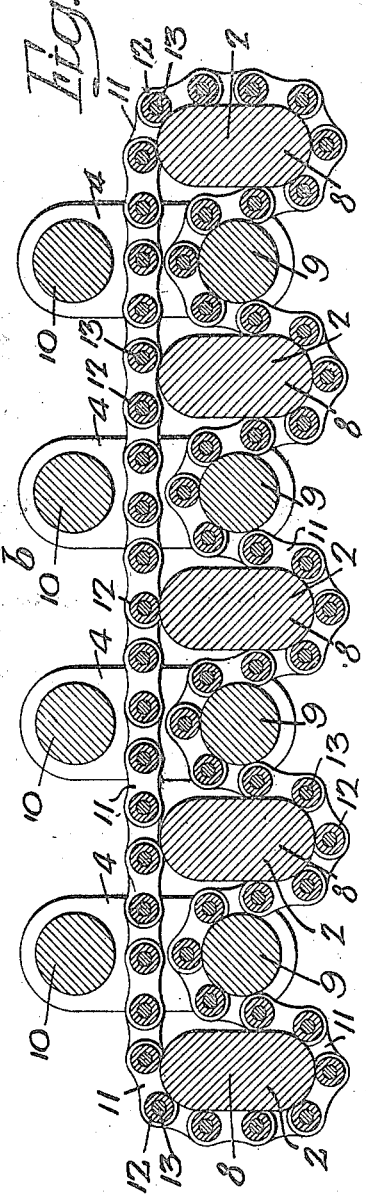
Inventor-
Harold S. Pierce.
by his Attorneys

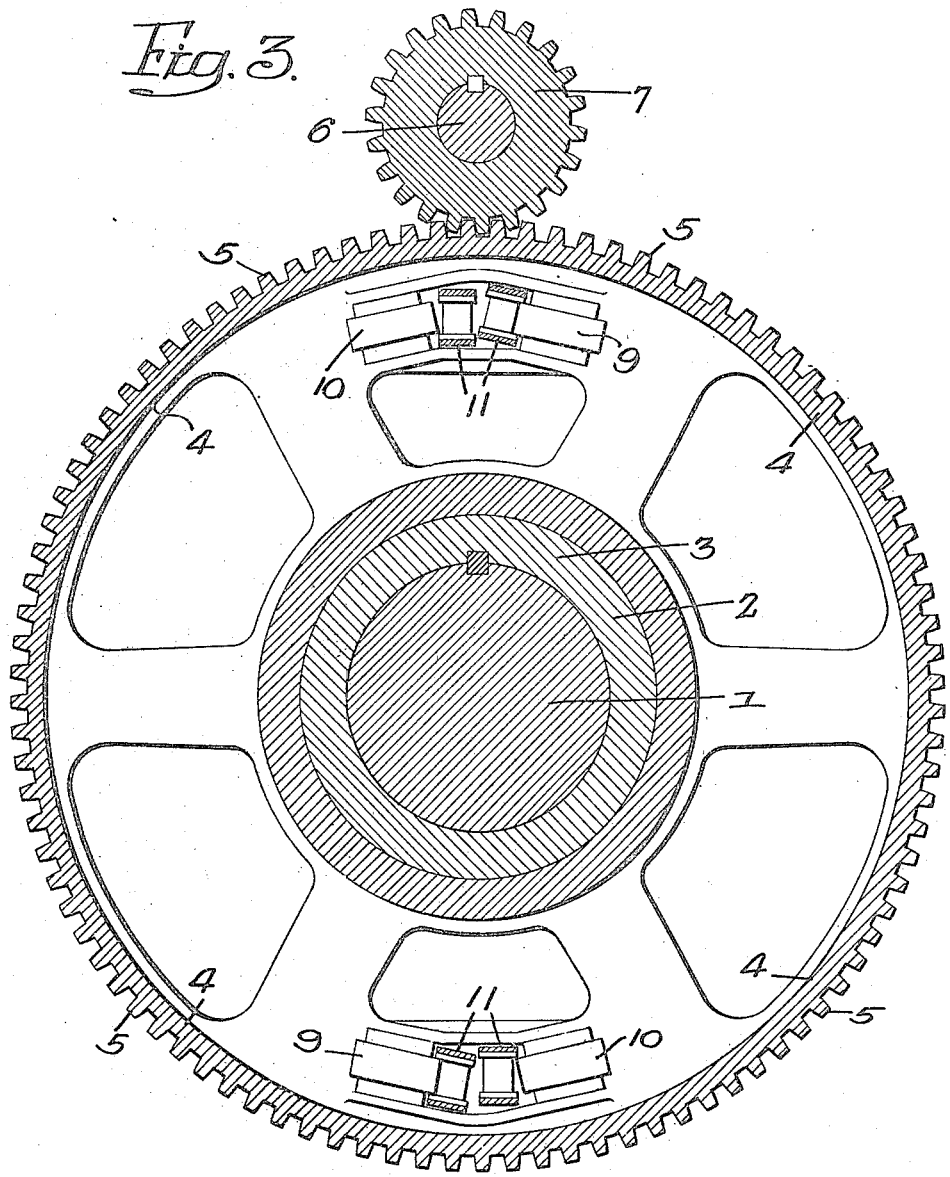

H. S. PIERCE.
EQUALIZING GEAR.
APPLICATION FILED JULY 8, 1915.

1,248,396.

Patented Nov. 27, 1917.
3 SHEETS—SHEET 3.

Inventor:—
Harold S. Pierce,
by his Attorneys.

UNITED STATES PATENT OFFICE.

HAROLD S. PIERCE, OF PHILADELPHIA, PENNSYLVANIA, ASSIGNOR TO LINK-BELT COMPANY, OF CHICAGO, ILLINOIS, A CORPORATION OF ILLINOIS.

EQUALIZING-GEAR.

1,248,396.  Specification of Letters Patent.  Patented Nov. 27, 1917.

Application filed July 8, 1915. Serial No. 38,733.

*To all whom it may concern:*

Be it known that I, HAROLD S. PIERCE, a citizen of the United States, residing in Philadelphia, Pennsylvania, have invented certain Improvements in Equalizing-Gears, of which the following is a specification.

My invention relates to certain improvements in gear drives and is particularly adapted for use in connection with drives in which considerable power is transmitted and in which a wide pinion is used in connection with a gear wheel. When gears of considerable width are used, and particularly where one is of comparatively small diameter, great care has to be exercised in truing the teeth and in assembling the two elements so as to insure the proper contact of the teeth throughout the width of the gear and, even with the greatest care, the pressure on the teeth varies and in many instances certain portions of the teeth are subjected to greater strains than other portions, consequently, the teeth are liable to fracture.

The object of the invention is to relieve the gear teeth of the undue strains such as mentioned above, and this object I attain by dividing one of the elements into two or more sections so that the pressure will be distributed evenly throughout the width of the elements.

In the accompanying drawings:—

Figure 1, is a side view, partly in section, illustrating my improved gear drive;

Fig. 2, is a sectional plan view on the line *a—a*, Fig. 1;

Fig. 3, is a transverse sectional view on the line *b—b*, Fig. 1;

Figure 5:
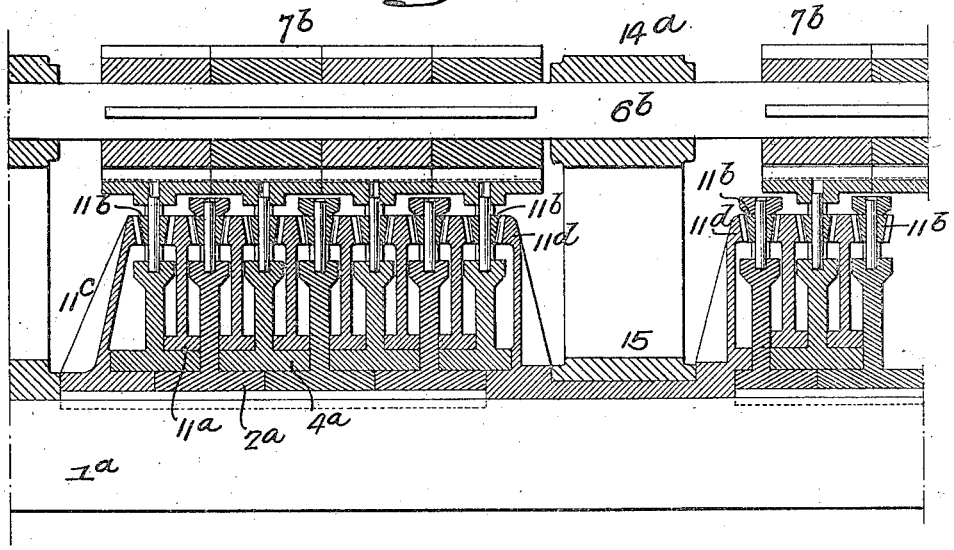
Fig. 5, is a view of a modification showing an equalizing system extending beyond the bearings.

Referring to Figs. 1 to 3, inclusive, of the drawings, 1 is the shaft on which are secured the hub elements 2. The hubs of these elements, in the present instance, are extended so as to abut one another, and mounted on the hub 3 of the hub elements are the rim elements 4 having the gear teeth 5 thereon. The rims are preferably of such width that they will be located close together when the parts are assembled, as in Fig. 1, and will inclose the equalizing mechanism and the hub elements.

6 is a shaft on which is mounted the pinion 7, the teeth of which mesh with the teeth of the several rim elements, as illustrated in the drawings. In the present instance, there are four rim elements and the pinion is of such a width as to engage the teeth of all four elements. On each hub element is a bearing 8 and on each rim element are bearings 9 and 10, in the present instance, which are spaced a given distance apart, as illustrated in Fig. 2. The pinion may be made in a single piece, as in Fig. 1, or may be made in sections, as in Figs. 4 and 5.

11 is an endless chain which passes in front of the several bearings 8 on the hub element 2 and back of each bearing 9 on the rim element 4. The return run of the chain passes back of all of the bearings 8 and between the bearings 9 and 10 of the rim element.

As the rim elements are loose on the hub elements it will be seen that, if one rim element bears upon the teeth of the pinion 7 in advance of the other elements, the equalizing gear will allow that particular rim element to move so as to slacken the endless equalizing chain and this slack will be immediately taken up by the movement of the other rim elements so that the pressure on all parts of the pinion will be equal. If the direction of movement of the drive is reversed then the bearings 10 act to take up the slack in the endless equalizing chain while the bearings 9 are moved out of operative position.

The equalizing chain shown in the drawings has rollers 12 at the pivots 13 and the links are of greater width than the rollers. Each of the bearings, 8, 9 and 10 is grooved to receive the links and this allows the rollers to rest upon the broad surface between the grooves, as illustrated in Fig. 1.

While I have described the equalizing device as a chain, it will be understood that rope gears or other flexible means may be used instead of a chain. The connection between the hub elements and the rim elements is such that in any case the pressure of the toothed rim elements will be equally distributed over the entire width of the pinion or other gear with which it meshes.

In a companion application filed on the 18th day of January, 1913, and which issued as a patent on July 27, 1915, under No. 1,148,190, I have described and claimed my invention as applied to a chain drive for equalizing the tension on a series of chains which pass around a sprocket wheel. The present invention, as stated above, relates to the means for equalizing the pressure of the teeth of one element upon the teeth of another element so as to distribute the strains.

The special construction of my invention enables me to make an equalizing gear which can be located in a wheel of comparatively small diameter and in which the elements can be multiplied without increasing the diameter of the wheel, and while a single chain may be used, I prefer to use two endless chains, as clearly shown in Fig. 3.

Figure 4:
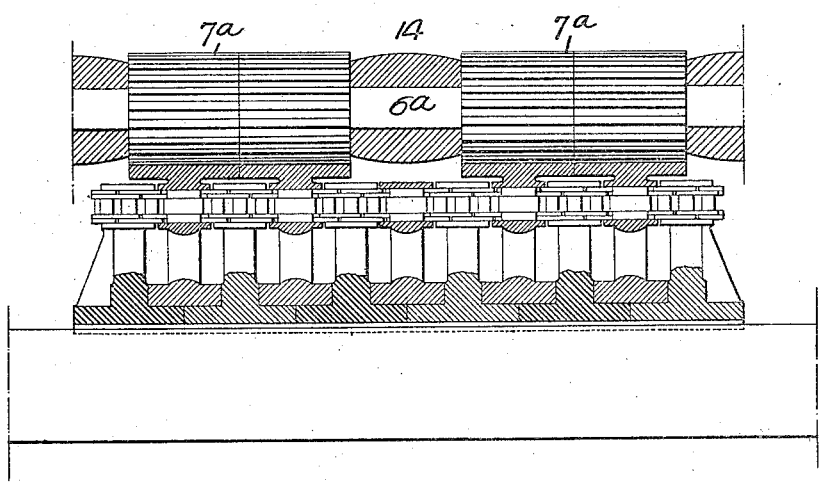
Fig. 4, is a sectional view of a modification showing a bearing located between two sets of pinions.

In Fig. 4, I have shown the pinion made in sections 7$^a$, all keyed to the shaft. These sections are spaced apart to allow for the insertion of a bearing 14 for the shaft 6. These pinion sections form a toothed wheel meshing with the teeth of all of the toothed rim elements.

In Fig. 5, I have shown a chain of gears 11$^a$, 11$^b$ as a substitute for the endless chain 11. In this instance each alternate gear 11$^b$ is mounted on a short radiating spindle carried by the hub elements 2$^a$ and the rim elements 4$^a$, while the intermediate gears 11$^a$ are loosely mounted between the above elements, as clearly shown in Fig. 5; the action being similar to the chain illustrated in Fig. 1. In this instance the end gear wheel 11$^c$ is secured to the shaft 1$^a$ and the gear wheel 11$^d$ is made double and extended so as to allow space for a bearing for the shaft 1$^a$ as well as for said gear wheel, and the pinion which is made in sections 7$^b$ and keyed to the shaft 6$^b$ are spaced apart to allow for a bearing 14$^a$ for the shaft 6$^b$. By this means very long and comparatively small shafts can be used with bearings arranged at intervals.

I claim:—

The combination in an equalizing gear, of a shaft; a series of hub elements secured to the shaft; a series of toothed rim elements alternating with the hub elements and loose with respect to the shaft; a toothed wheel meshing with the teeth of all of the toothed rim elements; and means connecting the hub elements and the toothed rim elements so that, when any one of said rim elements is subjected to an uneven strain, the strain will be distributed throughout the series and the power will be transmitted through the several hub elements from or to the shaft.

HAROLD S. PIERCE.

Copies of this patent may be obtained for five cents each, by addressing the "Commissioner of Patents, Washington, D. C."